United States Patent [19]

Cole et al.

[11] Patent Number: 4,674,714

[45] Date of Patent: Jun. 23, 1987

[54] DUCT FOR HOT AIR

[75] Inventors: Derek Cole; Michael J. Arnold, both of Bangor, Northern Ireland

[73] Assignee: Short Brothers PLC, Belfast, Northern Ireland

[21] Appl. No.: 784,244

[22] Filed: Oct. 4, 1985

[30] Foreign Application Priority Data

Oct. 8, 1984 [GB] United Kingdom ............... 8425398

[51] Int. Cl.⁴ .............................................. B64D 15/04
[52] U.S. Cl. ................................ 244/134 B; 244/207; 244/134 R; 138/104; 138/114
[58] Field of Search ............ 244/134 R, 134 B, 134 C, 244/207, 208, 53 B; 138/104, 114, 92; 165/11.1, 11.2; 285/13

[56] References Cited

U.S. PATENT DOCUMENTS

| | | | |
|---|---|---|---|
| 327,996 | 10/1885 | Brick | 285/13 |
| 2,636,666 | 4/1953 | Lombard | 244/134 C |
| 2,668,596 | 2/1954 | Elliott | 244/134 C |
| 2,820,601 | 1/1958 | Crawford | 244/134 B |
| 3,749,336 | 7/1973 | Christensen et al. | 244/134 B |
| 3,830,290 | 8/1974 | Thamasett et al. | 138/104 |
| 3,917,193 | 11/1975 | Runnels . | |
| 3,933,327 | 1/1976 | Rosenthal et al. | 244/134 B |
| 4,482,114 | 11/1984 | Waters et al. | 244/134 B |

FOREIGN PATENT DOCUMENTS

| | | | |
|---|---|---|---|
| 637598 | 5/1950 | United Kingdom | 244/134 B |
| 1578316 | 11/1980 | United Kingdom | 138/104 |

Primary Examiner—Joseph F. Peters, Jr.
Assistant Examiner—Rodney Corl
Attorney, Agent, or Firm—Kenyon & Kenyon

[57] ABSTRACT

The duct (16) which delivers hot air (F) to the inside surface of the leading edge of a turbo-fan inlet cowl, for de-icing of the leading edge (11), is made double-walled (16,21) in order to safeguard from overheating the materials from which the cowl is constructed in the event of rupture of the duct. Preferably the flow of hot air in the outer duct blows open a hinged door (26) in the skin (10) of the cowl to provide a visual indication of the rupture of the inner duct. The outer duct can be made narrow enough to maintain working pressure in the inner duct after rupture.

6 Claims, 1 Drawing Figure

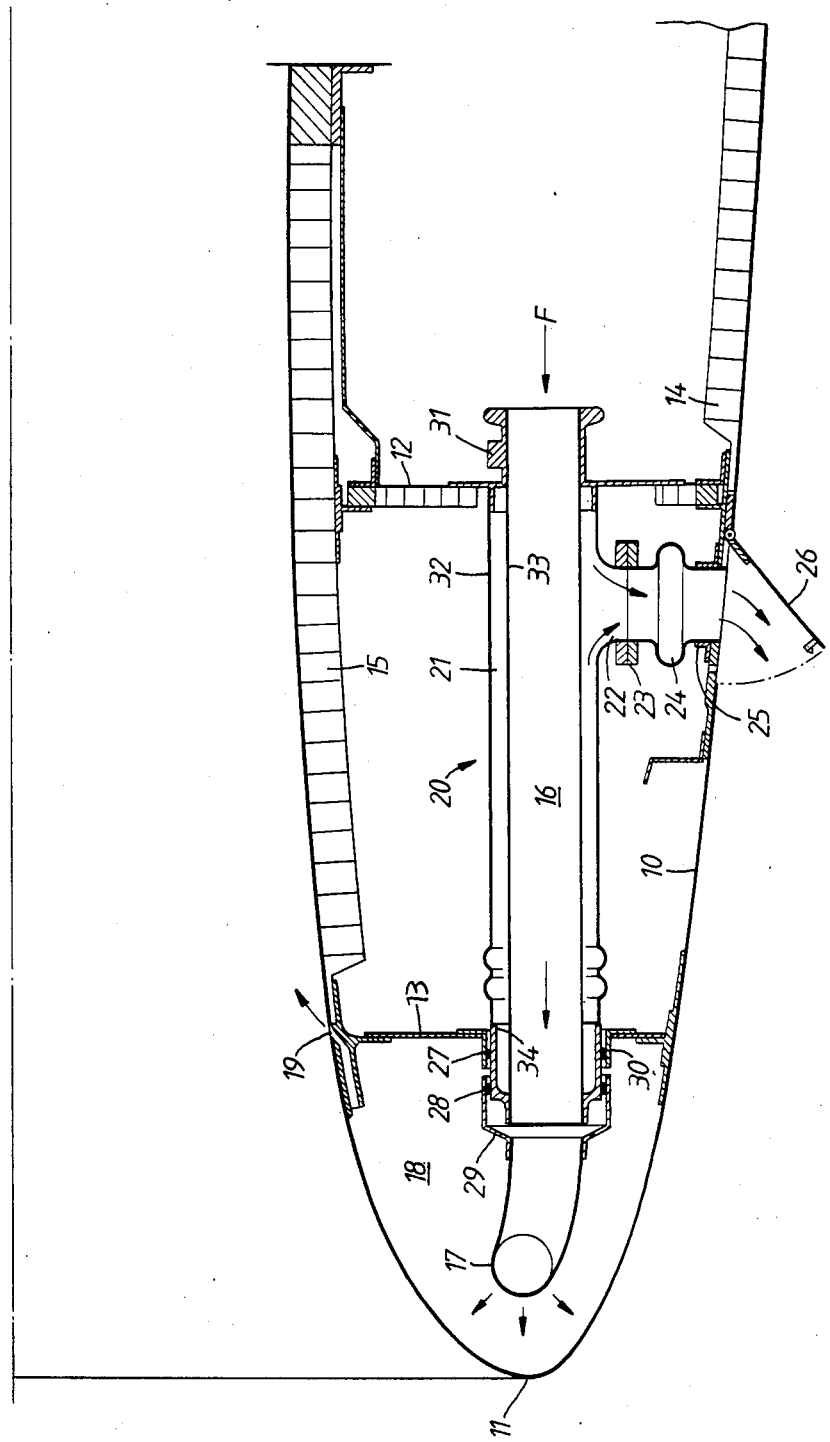

DUCT FOR HOT AIR

BACKGROUND OF THE INVENTION

1. Field of the Invention

This invention relates to a duct for conveying hot air to a selected area on the inside surface on a skin of an aircraft in a hollow aerostructural component of the aircraft, for preventing accumulation of ice on the external surface of the skin of the aircraft in the said selected area.

2. Description of the Prior Art

There is increasing use of fibre/resin composite materials in the manufacture of the inlet cowls of turbo-fan aircraft engines. It is necessary to prevent accumulation of ice on the external surfaces of these inlet cowls and it has been proposed to achieve this by channelling hot air deriving from the turbo-fan engine served by the cowl, along a duct within the hollow cowl, to a hot air spray ring located within the annular leading edge of the cowl.

A major problem, especially when maximum use is made of composite materials, is the difficulty of protecting these materials from damage caused by over-heating, when excessive quantities of hot air are incident upon them following rupture of a duct carrying the hot air.

It is one object of the present invention to alleviate this problem.

SUMMARY OF THE INVENTION

According to the present invention, there is provided a duct within a hollow aerostructural component of an aircraft, the duct serving to convey hot air to a selected area on the inside surface of the skin of the component for preventing the accumulation of ice on the external surface of the skin in the selected area, wherein the duct is double-walled, in that it comprises an inner duct through which the hot air flows and an outer duct which contains the inner duct and which is connected to the periphery of an opening in the skin, thereby to contain such hot air as escapes from the inner duct, upon a rupture of the inner duct, and channel the said hot air so that it issues from the opening and thereby provides an indication of said rupture.

It will be appreciated that a duct in accordance with the invention is not only able to protect the composite materials of the aerostructural component from over-heating damage, but also to provide early warning of rupture of the duct, which makes early remedial action more likely.

Preferably the opening in the skin of the aircraft is closed by a door, which is displaced as soon as the inner duct ruptures and hot air flows to the opening. This displacement of the door serves as a pronounced and distinctive visual indication of duct failure.

BRIEF DESCRIPTION OF THE DRAWING

For a better understanding of the present invention, and to show more clearly how the same may be carried into effect, reference will now be made to the accompanying drawing, which is a part-section through an inlet cowl of a turbo fan aircraft, in a plane which includes the central, longitudinal axis of the cowl.

DETAILED DESCRIPTION OF A PREFERRED EMBODIMENT

The drawing shows the leading edge only of the cowl, on one side of the longitudinal axis of the cowl as a whole.

The cowl has an outer skin 10 of fibre/resin composite material, and the shape of the cowl as a whole can be said to be toroidal or annular with a leading edge 11. The skin 10 is supported on a rear bulkhead 12 and a front bulkhead 13, the whole being supported by a conical barrel structure 15, constituted by sound-attenuating honeycomb liner laminated assemblies.

The area of the skin around the leading edge 11 is prone to icing, and accumulation of icing is prevented by channelling a flow F of hot air deriving from the engine within the cowl along a duct 16 to an annular ring 17 which is co-axial with the central longitudinal axis of the cowl as a whole. The hot air flows through a multitude of small apertures (not shown) in the wall surface of the ring 17 which is consequently referred to as a "spray ring".

The hot air which issues from the spray ring 17 flows over all of the interior surface of the area of the skin 10 in the region of the leading edge 11 of the cowl and then exhausts from the volume 18 of the cowl ahead of the front bulkhead 13 through an exhaust slit 19 adjacent to the forward part of the conical barrel structure 15.

The duct 16 constitutes an inner duct of a double-walled duct assembly 20 which includes an outer duct 21 which is closed at both ends but has a short offtake duct 22 the axis of which is perpendicular to the longitudinal axis of the inner duct 16. The offtake duct 22 connects by means of a flange 23 to an outlet duct 24 which in turn mates with a flange 25 surrounding an opening in the skin 10 of the aircraft. This opening is normally closed by a door 26 controlled by a pre-set spring loaded latch, but the door is blown open whenever there is an increased pressure of hot air in the outlet duct 24 following rupture of the wall surface of the inner duct 16. Conveniently, the door 26 is hinged to the skin adjacent the opening, so that it is not lost completely when it is blown out, and so that it provides a good visual indication of failure of the duct 16.

There needs to be accommodation of thermal expansion and contraction, and this is provided for by the use of a pair of slidable sealing rings 27 and 28 on the external wall surface of the leading end of the outer duct 21, the front sealing ring 28 sliding on the inside surface of a housing 29 which connects the duct 16 to the spray ring 17, and the rear sealing ring 27 sliding on a flange 30 around the opening in the front bulkhead 13 through which the duct assembly 20 protrudes. The surfaces on which the sealing rings slide preferably have a wear resistant coating.

At the trailing end of the duct assembly 20, a machined flange 31 serves both to secure the inner annulus 16 to the rear bulkhead 12, but also to secure the outer skin 32 of the duct assembly to the skin 33 of the inner duct 16. The seal carrier 34 at the leading end of the duct assembly 20, which carries the seals 27 and 28, also serves to connect the wall surfaces 32 and 33. It is analogous to a piston sliding within cylinders constituted by the flange 30 and housing 29. The sealing rings 27 and 28 can be considered to constitute piston rings. The outer duct 21 is rendered gas-tight at its leading end by seal carrier 34 and at the trailing end by the flange 31 so that, in the event of rupture of the wall 33, the hot gas in the outer duct 21 has nowhere to go but out through the outlet duct 24. In other embodiments, instead. of providing sliding seals at the front of the duct they could be provided at the rear end, one at each end of the duct, or at both ends.

It will be appreciated that, in this way, the composite materials which make up the structural elements 10,12,13 and 15 of the cowl are protected from overheating by incidence thereon of excessive quantities of the hot air F emanating from within the duct 16 while the pressure on the outer duct skin 32 is considerably reduced.

In the illustrated embodiment, the offtake 22 and outlet 24 ducts have a diameter large enough to allow gas pressure in the duct assembly 20 to fall to a low level once the door 26 has been forced open. In an alternative embodiment, the diameter is made smaller, or the rate of escape of gas otherwise reduced, so as to maintain working pressure of gas in the duct assembly 20 even after rupture of the wall of the duct 16.

We claim:

1. A duct within a hollow aerostructural component of an aircraft, the duct serving to convey hot air to a selected area on the inside surface of the skin of the component for preventing the accumulation of ice on the external surface of the skin in the selected area, wherein the duct is double-walled, in that it comprises an inner duct through which the hot air flows, an outer duct which contains the inner duct and which is connected to the periphery of an opening in the skin, thereby to contain such hot air as escapes from the inner duct, upon a rupture of the inner duct, and a door by which the opening in the skin is normally closed, which door is displaceable upon rupture of the inner duct, by the flow of hot air along the outer duct to the said opening, the displacement of the door serving to provide an indication of the rupture of the inner duct.

2. A duct as claimed in claim 1 including a hinge by which the door is connected to the skin, which hinge retains the open door to the skin after rupture of the inner duct has caused the door to open.

3. A duct as claimed in claim 2 including a spring-biased latch to retain the door in its normal closed position, prior to said rupture.

4. A duct within an inlet cowl of a turbo-fan engine of an aircraft, the duct serving to convey hot air to a selected area on the inside surface of the skin of the leading edge of the inlet cowl for preventing the accumulation of ice on the external surface of the skin in the selected area, wherein the duct is double-walled, in that it comprises an inner duct through which the hot air flows and an outer duct which contains the inner duct and which is connected to the periphery of an opening in the skin, thereby to contain such hot air as escapes from the inner duct, upon a rupture of the inner duct, and channel the said hot air so that it issues from the opening and thereby provides an indication of said rupture, and wherein the duct runs lengthwise of the inlet cowl and spans the space between a rear bulkhead and a front bulkhead for delivery of hot air to a spray ring in a cavity forward of the front bulkhead, the duct including at its forward end a pair of slidable sealing rings, one of which seals the duct to the spray ring, and the other of which seals the duct to the front bulkhead.

5. A duct as claimed in claim 4 including a seal carrier in which the sealing rings are mounted, which carrier itself seals the annular gap, between the inner duct and the outer duct, at the forward end of the duct.

6. A duct as claimed in claim 4, including an offtake duct with which the outer duct communicates and which branches laterally from the outer duct, and an outlet duct which is connected to the periphery of the said opening and to the offtake duct.

* * * * *